(12) United States Patent  (10) Patent No.: US 8,509,436 B2
Selinfreund et al.  (45) Date of Patent: Aug. 13, 2013

(54) REMOTE CIRCUIT LOCKING SWITCH SYSTEM

(76) Inventors: Richard H. Selinfreund, Terre Haute, IN (US); Fred Berry, Terre Haute, IN (US)

( * ) Notice: Subject to any disclaimer, the term of this patent is extended or adjusted under 35 U.S.C. 154(b) by 516 days.

(21) Appl. No.: 12/753,249

(22) Filed: Apr. 2, 2010

(65) Prior Publication Data

US 2010/0254535 A1  Oct. 7, 2010

Related U.S. Application Data

(60) Provisional application No. 61/166,460, filed on Apr. 3, 2009.

(51) Int. Cl.
*H04K 1/00*  (2006.01)

(52) U.S. Cl.
USPC ............ 380/256; 380/270; 359/622; 604/890

(58) Field of Classification Search
USPC ................. 380/255–256; 604/890; 359/621
See application file for complete search history.

(56) References Cited

U.S. PATENT DOCUMENTS

| | | | | |
|---|---|---|---|---|
| 5,321,774 A * | 6/1994 | Barnard et al. | ................. | 385/16 |
| 5,712,915 A * | 1/1998 | Onufry, Jr. | .................... | 380/270 |
| 6,594,068 B2 * | 7/2003 | Sui | ................................ | 359/280 |
| 7,404,088 B2 * | 7/2008 | Giobbi | ......................... | 713/193 |
| 7,414,728 B2 * | 8/2008 | Caplan | .......................... | 356/477 |
| 7,555,177 B1 * | 6/2009 | Bahuguna et al. | .............. | 385/16 |
| 7,583,803 B2 * | 9/2009 | Trifonov | ...................... | 380/256 |
| 8,027,473 B2 * | 9/2011 | Stiscia et al. | .................. | 380/256 |
| 8,204,231 B2 * | 6/2012 | Maeda et al. | .................. | 380/279 |
| 8,279,901 B2 * | 10/2012 | Karavitis | ......................... | 372/25 |
| 8,378,474 B2 * | 2/2013 | Ellis | .............................. | 257/682 |
| 2003/0123781 A1 * | 7/2003 | Rockwell et al. | ............... | 385/15 |
| 2006/0274320 A1 * | 12/2006 | Caplan | .......................... | 356/491 |
| 2007/0139213 A1 * | 6/2007 | Akers et al. | .............. | 340/825.69 |
| 2008/0267635 A1 * | 10/2008 | Kawamoto et al. | ........... | 398/141 |

OTHER PUBLICATIONS

Yuang MC, Experimental Testbed System, vol. 46, pp. 158-166.*
Jin-Wei Tioh et al., Magnetically Controlled Switches for Optoelectronics Networking: The Problem, Available Technology, New Implementations, IEEE Transactions on Magnetics, vol. 43, No. 6, pp. 2698-2700, Jun. 2007.

* cited by examiner

*Primary Examiner* — Nathan Flynn
*Assistant Examiner* — Viral Lakhia
(74) *Attorney, Agent, or Firm* — Pearl Cohen Zedek Latzer, LLP

(57) ABSTRACT

A method and apparatus for remotely controlling access to the components of an optically interconnected information processing infrastructure is presented. Access to the infrastructure is controlled independently of the infrastructure operating system.

2 Claims, 7 Drawing Sheets

REMOTE CIRCUIT LOCKING SWITCH SYSTEM

CROSS-REFERENCE TO RELATED APPLICATIONS

This non-provisional patent application claims the benefit of U.S. Provisional Patent Application Ser. No. 61/166,460, filed Apr. 3, 2009, the entire disclosure of which is incorporated by reference in its entirety herein.

BACKGROUND OF THE INVENTION

The high data rate demands of modern information processing infrastructure have led to the use of optical data transmission technology for the interconnection of infrastructure components. As the threat to information processing infrastructures continues to increase, the requirements for security become more demanding. Computer systems, communications systems and traffic control systems, all of which are computer processor based, are examples of highly autonomous information processing infrastructures that require the highest level of protection from unauthorized access. In each of these systems, the various components of the infrastructure are accessed by one or more data communications networks. Typically, access control for these systems is provided by internally implemented security software operating integrally within the network. The weakness of such an approach is that the security system is vulnerable to attack from anywhere within the data communications network. There is a requirement for a security system that is not accessible from within the data communications network.

SUMMARY OF THE INVENTION

In embodiments there is provided an apparatus comprising: a command receiver comprising an encrypted signal input port and an encrypted data output port and electronic circuitry operatively configured to receive and demodulate an encrypted command signal from the encrypted signal input port and output encrypted data from the encrypted data output port; a decryption sub-assembly comprising an encrypted data input port, electrically connected to the encrypted data output port, and a decrypted data output port and electronic circuitry operatively configured to decrypt encrypted data applied to the encrypted data input port and output decrypted data from the decrypted data output port; an optical switch, interconnected between components of an information processing infrastructure, and comprising an input optical port, an output optical port, and a control signal input port electrically connected to the decrypted data output port, the switch characterized by a first switch state that optically connects the input optical port and the output optical port, the switch further characterized by a second switch state that optically isolates the input optical port from the output optical port, the first switch state and the second switch state selected by application of corresponding control signal to the control signal input port. The optical switch may comprises a polarization beam splitter, at least one Faraday polarization rotator, and a polarization beam combiner.

In further embodiments there is provided a method comprising: operatively interconnecting components of an optical bus interconnected information processing infrastructure with an optical switch; receiving an encrypted command signal; demodulating the encrypted command signal to produce a encrypted data signal; decrypting the encrypted data signal to produce switch control signal; and changing state of the optical switch from a first state to a second state in response to the switch control signal.

BRIEF DESCRIPTION OF THE DRAWINGS

The accompanying figures incorporated in and forming a part of the specification illustrate several aspects of embodiments of the invention and, together with the description, serve to explain the embodiments. In the drawings.

DETAILED DESCRIPTION OF THE INVENTION

The Remote Circuit Locking system provides the ability to remotely activate or deactivate an information processing infrastructure. Activation or deactivation is independent of the infrastructures software operating system and is not vulnerable to software based hacking from points throughout the infrastructure network.

Figure 1:
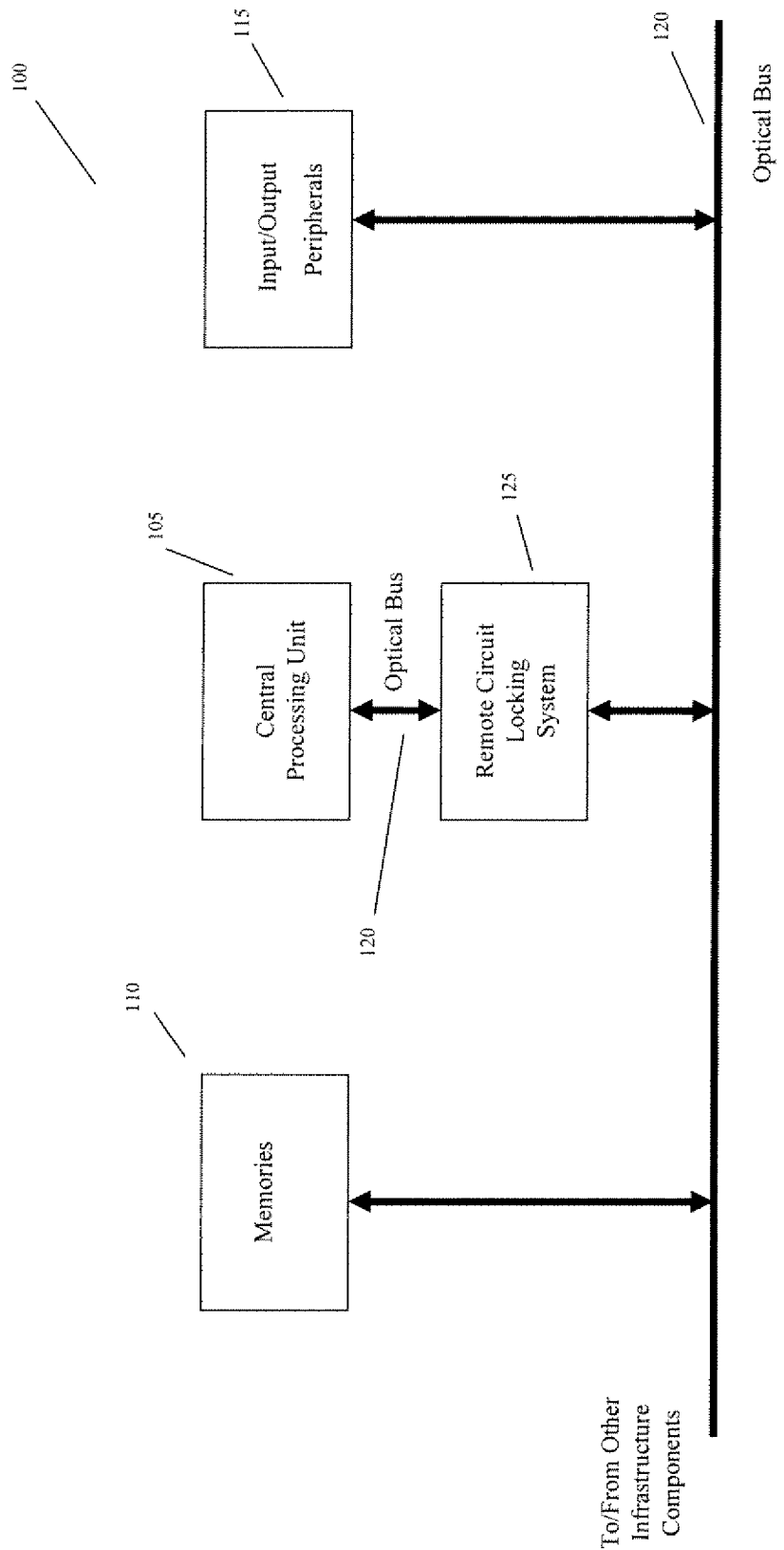
FIG. 1 is a simplified block diagram of an information processing infrastructure comprising a Remote Circuit Locking system.

In an embodiment, a system and method is described which provides the capability of remotely controlling operation of a central processing unit or other component(s) of an information processing infrastructure. FIG. 1 schematically illustrates a block diagram of an information processing infrastructure 100 comprising a central processing unit 105, one or more electronic memories 110, multiple input/output peripheral devices 115, and an optical bus 120 operatively interconnecting each of component units. Optical bus technologies are widely employed to interconnect the infrastructure components. The various system components may either be locally or remotely located. In addition to the interconnection with the memories and peripheral devices, the central processing unit must be connected to sources of clock, timing, and control waveforms. Interruption of one or more of these infrastructure interconnections, by a switch located in a critical signal path, can prevent operation of all or a portion of the infrastructure.

Figure 2:
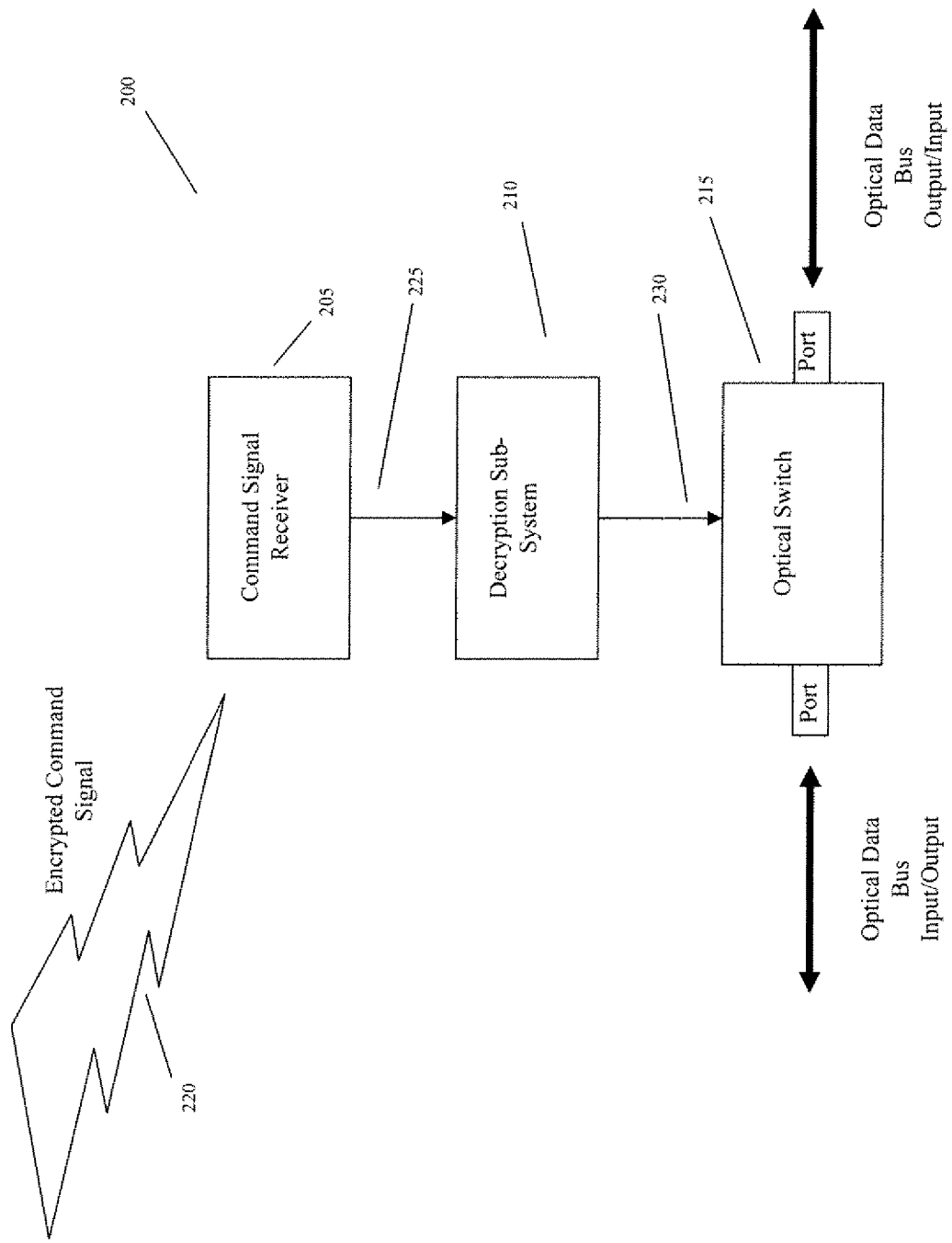
FIG. 2 is a simplified block diagram of the major components of the Remote Circuit Locking system.

The information processing system, portrayed in FIG. 1, further comprises a Remote Circuit Locking system 125 that performs a remote activation/deactivation function. As shown in FIG. 2, the Remote Circuit Locking Switch system 200 comprises a command signal receiver 205, a decryption subsystem 210, and a locking switch 215. The command receiver 205 receives an encrypted command signal 220 from a remotely located command transmitter (not shown). The encryption/decryption algorithms employed are selected to provide adequate security, to protect from the defined threat environment, as is known to those in the field. The encrypted command signal 220 may be transmitted via wired or wireless transmission technologies. Suitable wireless technologies are exemplified by radio frequency, optical frequency, and acoustic frequency communications systems. Suitable wired technologies are exemplified by conductive cable, waveguide and optical fiber communications systems. The command receiver demodulates the encrypted signal 220 and outputs the demodulated signal 225 to the decryption sub-system 210. The decryption sub-system 210 decodes the demodulated signal 225 and outputs the appropriate control signals 230 to the Remote Locking switch 215.

One or more optical switches are placed at one or more locations within the data signal paths comprising the information processing infrastructure. Each of the optical switches is characterized by an on-state, where the signal passes through the switch, and an off-state where the signal does not pass.

Figure 3:
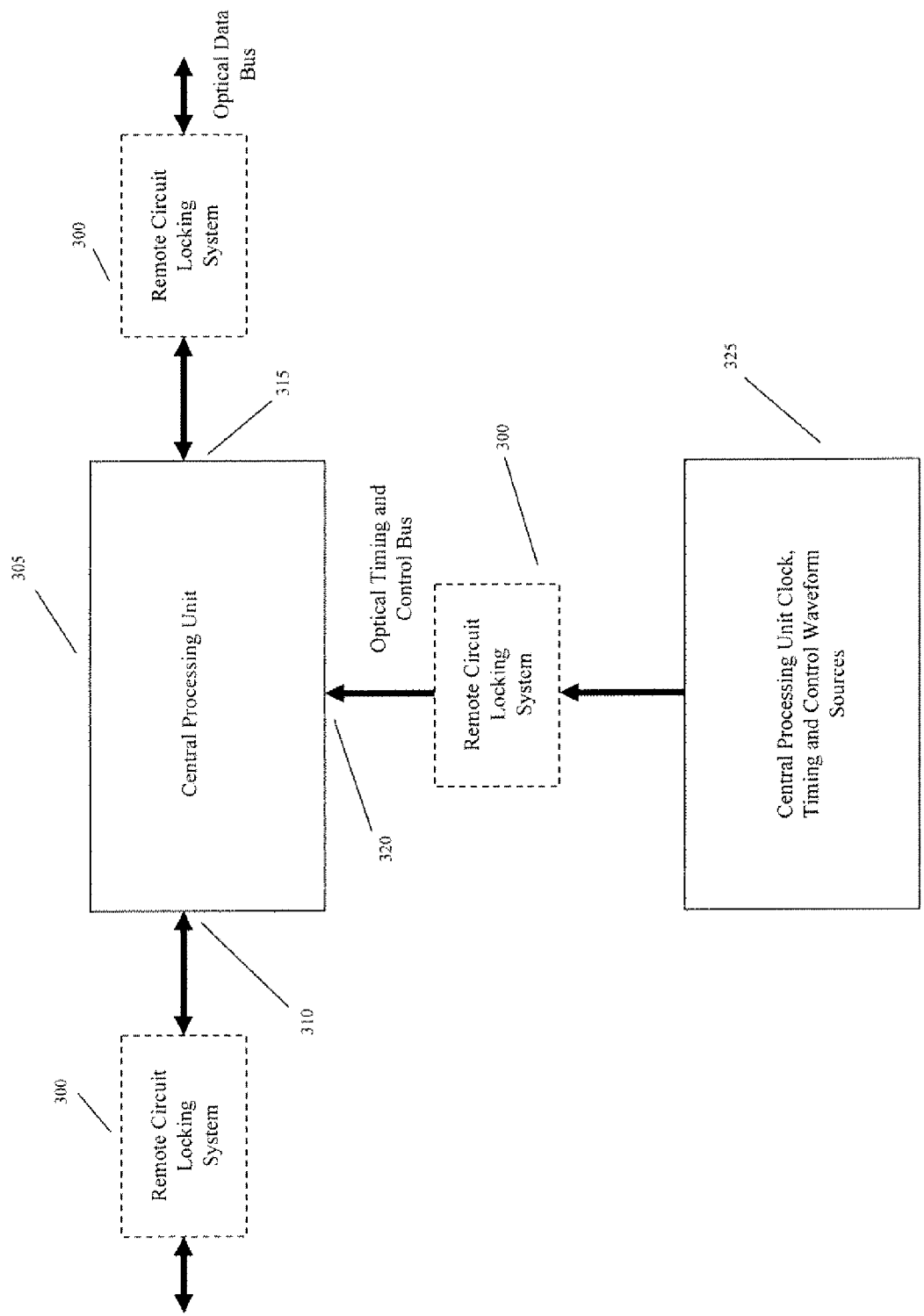
FIG. 3 schematically indicates potential alternative locations for the Remote Circuit Locking system switch in a exemplar simplified information processing infrastructure.
Figure 4:
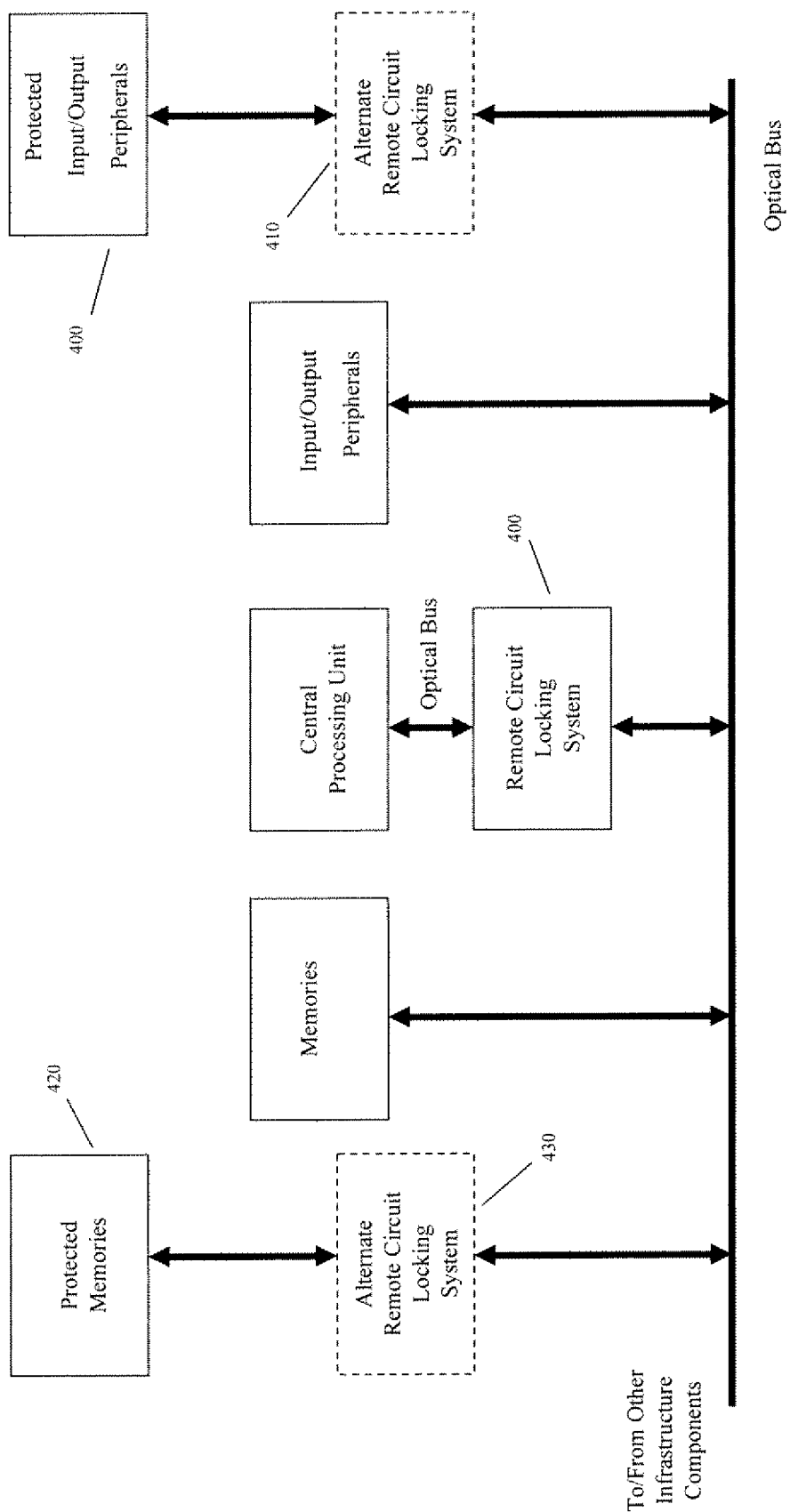
FIG. 4 illustrates a Remote Circuit Locking switch configuration were only a portion of an exemplar information processing infrastructure is to be locked.

As schematically shown in FIG. 3, potential placements of the switch 400 on a typical central processing unit 305, for example, include the data bus input 310, the data bus output 315, clock and timing signal input and output 320. In this embodiment, a locking switch is located between the central processing unit 305 and the central processing unit clock, timing and control waveform sources 325. In some applications, rather than activating or deactivating the whole infrastructure, the Remote Locking Switch may be configured to control only a portion of the infrastructure. FIG. 4 illustrates an exemplary embodiments where selected input/output peripherals 400 are locked by a first additional Remote Locking Switch system 410 while protected memories 420 are locked by a second additional Remote Locking Switch system 430.

Figure 5:
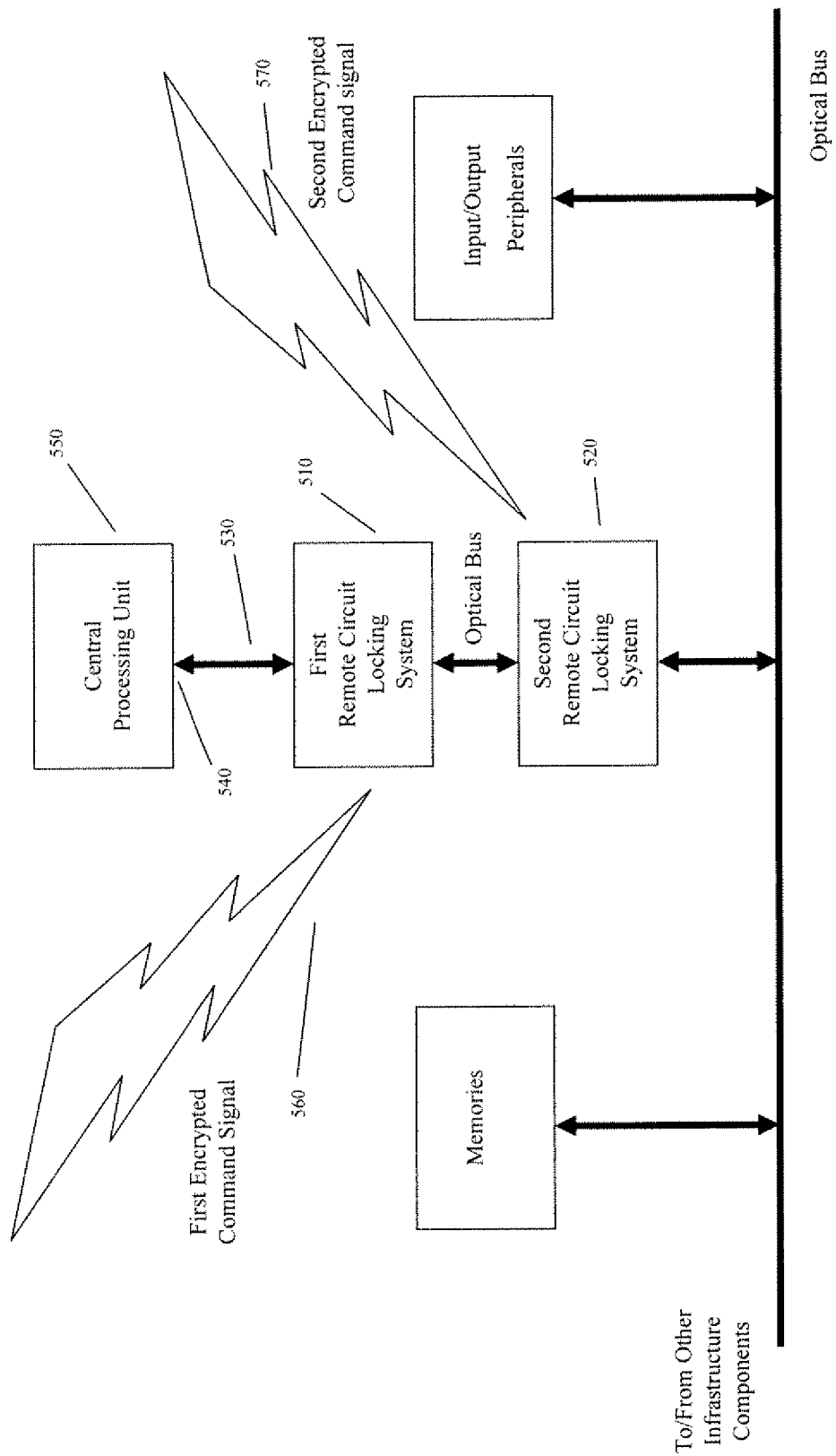
FIG. 5 illustrates a Remote Circuit Locking system where activation requires remote control from more than one remote location.

In another embodiment, activation/deactivation of all or a portion of the infrastructure can require remote control from more than a single remote controller. FIG. 5 schematically portrays a configuration where a first Remote Locking Switch 510 and a second Remote Locking Switch 520 are placed in series at the data bus input 540 to a central processing unit 550. Operation of the central processing unit 550 in this configuration requires separate activation of each of the two switches 510, 520. The state of the first switch 510 may be changed by application of a first encrypted command signal 560. The state of the second switch 520 may be changed by application of a second encrypted command signal 570. The properties and encryption of the first and second command signals may be dissimilar. The switches 510, 520 are located so that in the off-state, data signal transmission between the components is interrupted and the operation of the infrastructure is prevented.

The control signal for each switch 510, 520 is provided by decryption sub-system 210. A command signal receiver 205 receives encrypted command signals 560, 570 which may originate at a remote location. The command signals may be transmitted from the remote location using wired or wireless technologies. Examples of such technologies comprise electrical and optical cables, radio frequency wireless, and free space acoustic and optical. The encrypted command signals 560,570, received by the command receiver 205 are demodulated and fed to the decryption sub-system 210 where they are decoded and converted into the control signals 230 that control the corresponding switch 215.

Figure 6:
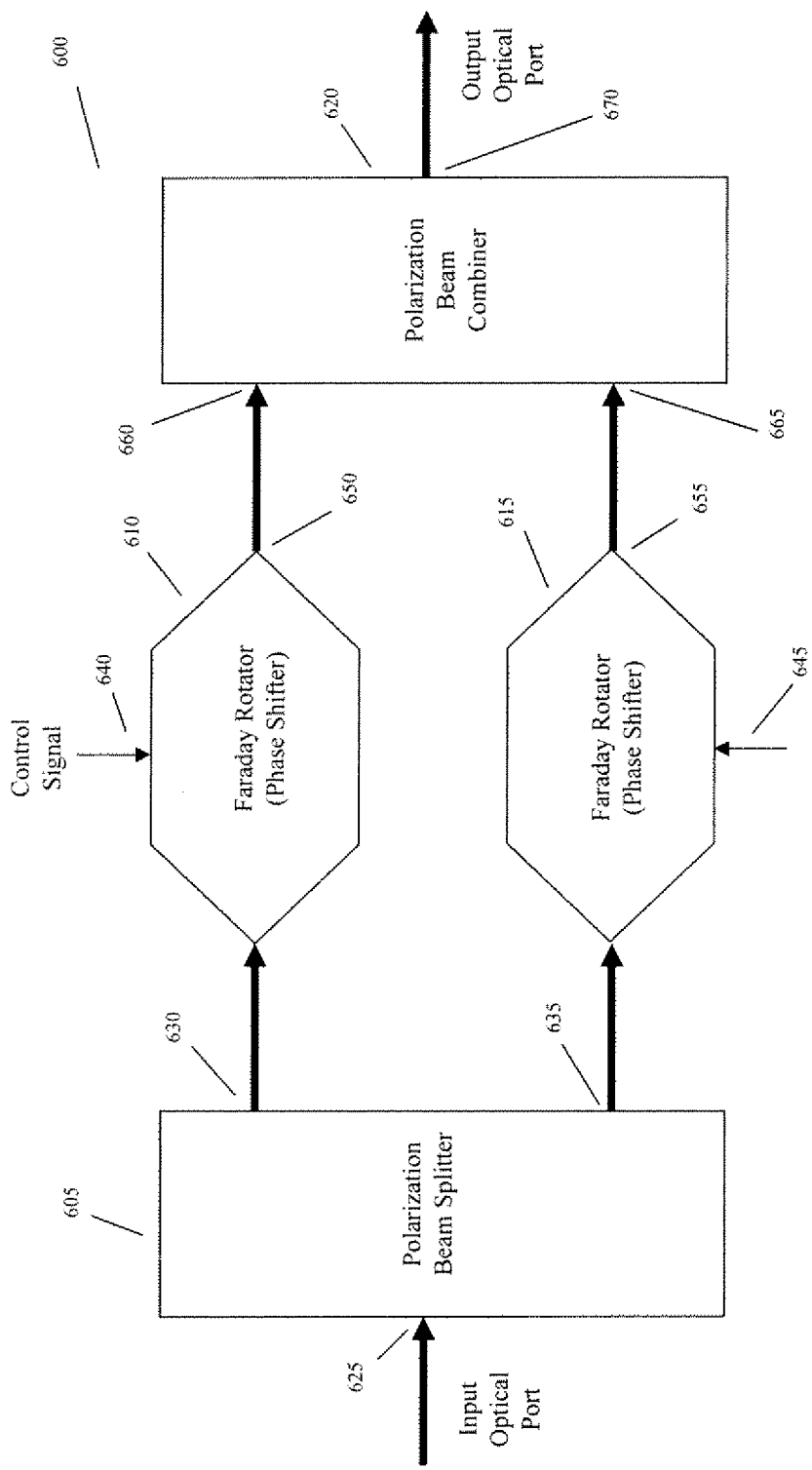
FIG. 6 is a simplified schematic of a magneto-optical switch for use in the Remote Circuit Locking system.
Figure 7C:
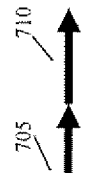
FIGS. 7a-f is a symbolic portrayal of the phase relationships of a signal propagating through a Remote Circuit Locking switch.
Figure 7F:
Figure 7B:
Figure 7E:
Figure 7A:
Figure 7D:

As shown in FIG. 6, an embodiment of an optical switch 600 comprises an polarization beam splitter 605, a first phase shifter 610 and, optionally, a second phase shifter 615, and a polarization beam combiner 620. The polarization beam splitter 605 divides the input signal, which is applied to the input port 625, into two approximately equal magnitude output signals having orthogonal polarizations at the two output ports 630, 635. At least one of the splitter output ports is connected to a phase shifter 610. Each phase shifter 610, 615 may be implemented as a Faraday rotator. Each phase shifter 610, 615 advances or retards the phase of the applied signal in accordance with a control signal 640, 645. The output ports 650, 655 of the phase shifters 610, 615 are individually connected to each of the respective input ports 660, 665 of the polarization beam combiner 620. For switch architectures employing a single phase shifter, the output port of the polarization beam splitter 635 is directly connected to the input port of the polarization beam combiner 665. The signals applied to the input ports of the polarization beam combiner are vectorally summed and output from the combiner output port 670.

FIG. 7 schematically illustrates the relationship between the data signal components at various points of the switch. In each illustration a linear vector is employed to represent the phase of the polarization of the signal. The vector 700 representing the input signal is portrayed at an angle of zero degrees relative to the x-axis of a Cartesian coordinate system in FIG. 7a. The two polarization beam splitter output signals 705, 710, as shown in FIG. 7b, are half the magnitude of the input vector 700 and are orthogonal with respect to one another. The Cartesian coordinate reference system of FIG. 7b and that of FIG. 7a may be arbitrarily rotated with respect to each other as long as the angular relationship between the vector components is correct. FIG. 7c portrays a first condition where the first and second phase shifters 610, 615 are set to advance the relative phase between the two vector components 705, 710 by ninety degrees. The vector components 705, 710 are now in-phase. FIG. 7d portrays a second condition wherein the phase shifters are set to retard the relative phase between the two vector components 705, 710 by ninety degrees. The vector components 705, 710 are now in opposite phase. FIG. 7e portrays the output of the polarization beam combiner 620 in response to inputs from the two phase shifters under the advance ninety degree relative phase shift (first condition). The input signal, for this condition, appears at the combiner output port 670. FIG. 7f portrays the combiner output 620 for the retard ninety degree relative phase shift (second condition). The vector components cancel each other resulting in zero output at the combiner output port 670. The switch thus provides signal transmission or interruption depending on the settings of the phase shifters.

In an embodiment, phase shifters meeting the performance requirements of the remote circuit locking switch may be implemented using a material the imparts Faraday rotation of polarized light as it passes through a magneto-optical material in the direction of an applied magnetic field. Bismuth-substituted iron garnet and/or orthoferrites are suitable Faraday rotation materials. Electro-magnetic coils surrounding the Faraday rotation material provide the required magnetic field, in response to an applied electrical control signal. The control signal may be derived from the output of the decryption sub-system.

An optical switch suitable for use in this application is described in the literature. (*Magnetically Controlled Switches for Optoelectronics Networking: The Problem, Available Technology, New Implementations*; Jin-Wei Tioh, Mani Mina, Robert J. Weber; IEEE Transactions on Magnetics, June 2007, Vol 43, No. 6, pp 2698-2700).

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features, and/or technical background.

What is claimed is:

1. An apparatus comprising:
a command receiver comprising an encrypted signal input port and an encrypted data output port and electronic circuitry operatively configured to receive and demodulate an encrypted command signal from said encrypted signal input port and output encrypted data from said encrypted data output port;
a decryption sub-assembly comprising an encrypted data input port, electrically connected to said encrypted data output port, and a decrypted data output port and electronic circuitry operatively configured to decrypt encrypted data applied to said encrypted data input port and output decrypted data from said decrypted data output port; and
an optical switch, interconnected between components of an information processing infrastructure, and comprising an input optical port, an output optical port, and a control signal input port electrically connected to said decrypted data output port, said switch characterized by a first switch state that optically connects said input optical port and said output optical port, said switch further characterized by a second switch state that optically isolates said input optical port from said output optical port, said first switch state and said second switch state selected by application of corresponding control signal to said control signal input port
wherein said optical switch comprises a polarization beam splitter, at least one Faraday polarization rotator, and a polarization beam combiner.

2. A method comprising:
operatively interconnecting components of an optical bus interconnected information processing infrastructure with an optical switch;
receiving an encrypted command signal;
demodulating said encrypted command signal to produce a encrypted data signal;
decrypting said encrypted data signal to produce switch control signal; and
changing state of said optical switch from a first state to a second state in response to said switch control signal;
wherein said optical switch comprises a polarization beam splitter, at least one Faraday polarization rotator, and a polarization beam combiner.

* * * * *